United States Patent [19]
Shimizu et al.

[11] Patent Number: 6,073,606
[45] Date of Patent: Jun. 13, 2000

[54] APPARATUS FOR CONTROLLING FUEL INJECTION FOR A DIRECT-INJECTION GASOLINE ENGINE AND A METHOD THEREOF

[75] Inventors: Hirokazu Shimizu; Kenichi Machida, both of Atsugi; Yuki Nakajima; Hiraku Ooba, both of Yokohama; Takamasa Ueda, Chigasaki, all of Japan

[73] Assignee: Unisia Jecs Corporation, Atsugi, Japan

[21] Appl. No.: 09/145,469

[22] Filed: Sep. 2, 1998

[30] Foreign Application Priority Data

Sep. 2, 1997 [JP] Japan .................................... 9-237265

[51] Int. Cl.[7] ...................................................... F02B 17/00

[52] U.S. Cl. ........................................... 123/295; 123/299

[58] Field of Search ..................................... 123/295, 299, 123/300, 305

[56] References Cited

U.S. PATENT DOCUMENTS 5,127,378   7/1992   Ito ............................................ 123/300

FOREIGN PATENT DOCUMENTS

5-71383   3/1993   Japan .

*Primary Examiner*—Tony M. Argenbright
*Attorney, Agent, or Firm*—Foley & Lardner

[57] ABSTRACT

In a direct-injection gasoline engine which is so constituted as to execute a twice-injection mode for injecting the fuel in the intake stroke and in the compression stroke, respectively, at the time of change-over between the stratified mode and the homogeneous mode, the fuel injection amount is set to be constant in either the intake stroke or the compression stroke in the twice-injection mode, and an amount obtained by subtracting the above constant amount from the required injection amount is injected in the other stroke. Setting the fuel amount to be constant at one injection timing makes it easy to comply with the operation for controlling the fuel injection in the twice-injection mode.

22 Claims, 4 Drawing Sheets

BASIC FUEL INJECTION AMOUNT TP

FIG.4

TARGET EQUIVALENCE RATIO

APPARATUS FOR CONTROLLING FUEL INJECTION FOR A DIRECT-INJECTION GASOLINE ENGINE AND A METHOD THEREOF

BACKGROUND OF THE INVENTION (1) Field of the Invention

The present invention relates to an apparatus for controlling fuel injection for a direct-injection gasoline engine and a method thereof. More specifically, the invention relates to technology for controlling a fuel injection amount in a mode of injecting fuel in an intake stroke and in a compression stroke in a cycle.

(2) Related Art of the Invention

There has heretofore been known a direct-injection gasoline engine equipped with fuel injection valves for directly injecting fuel into cylinders, which changes over, depending upon operation conditions, a stratified mode for injecting the fuel in a compression stroke only, a homogeneous mode for injecting the fuel in an intake stroke only, and a twice-injection mode for injecting the fuel in the intake stroke and in the compression stroke in a cycle (see Japanese Unexamined Patent Publication No. 5-71383).

In the twice-injection mode, a dividing ratio of a fuel injection amount is set in advance based upon a target average air-fuel ratio, the fuel injection amount in one injection timing is obtained from the total fuel amount to be injected in one cycle and from the dividing ratio, and the remainder of the required amount is injected in the other injection timing.

The twice-injection mode is executed at the time of change-over between the stratified mode and the homogeneous mode in order to avoid a sudden change in output torque of the engine. When the fuel injection amount is changed during each of the injection timings in the twice-injection mode depending upon a change in the target average air-fuel ratio, however, it becomes difficult to set a dividing ratio capable of eliminating a sudden change in the output torque and accomplishing excellent combustion stability.

SUMMARY OF THE INVENTION

The present invention was accomplished in view of the above-mentioned problems, and its object is to provide an apparatus for controlling fuel injection for a direct-injection gasoline engine, which is capable of easily conforming a fuel injection amount in the twice-injection mode and of stably eliminating a sudden change in output torque at the time of change-over between a stratified mode and a homogeneous mode, and a method thereof.

In order to accomplish the above-mentioned object, according to the apparatus and the method of controlling fuel injection for a direct-injection gasoline engine of the present invention, the fuel injection amount is set to be constant in either the intake stroke or the compression stroke in the twice-injection mode, and the fuel injection amount in the other stroke is variably set thereby to control the fuel amount injected in one cycle.

According to this constitution, even when a required fuel injection amount is changed in one cycle, the fuel injection amount is maintained constant in the twice-injection mode, e.g., maintained constant in the compression stroke, and the fuel injection amount is changed in the intake stroke to cope with the change in the required fuel injection amount. Similarly, when the fuel injection amount is maintained constant in the intake stroke, the fuel injection amount is changed in the compression stroke to change the fuel injection amount in one cycle. Thus, when the fuel injection amount is controlled to be constant in either the intake stroke or the compression stroke, only the fuel amount maintained constant may be conformed in the twice-injection mode. Therefore, the operation for controlling the fuel injection in the twice-injection mode can be easily conformed. This makes it possible to eliminate a sudden change in the output torque at the time of change-over between the stratified mode and the homogeneous mode yet maintaining high combustion stability.

Here, the above constant amount may be used as a fixed value that is stored in advance.

According to this constitution, the fuel injection amount in either the intake stroke or the compression stroke in the twice-injection mode is stored in advance, the thus stored fuel injection amount is held in the twice-injection mode, and the fuel is injected in a constant amount at all times irrespective of the operation conditions. Therefore, the fuel amount maintained constant needs not be conformed to a change in the operation conditions, and control characteristics can be most simply determined in the twice-injection mode.

Moreover, the above constant amount may be variably set depending upon the operation conditions in the first time of shift to the twice-injection mode.

According to this constitution, the fuel amount to be maintained constant in the twice-injection mode is determined depending upon the operation conditions in the first time of shift to the twice-injection mode. When the operation conditions are not the same in the first time of shift to the twice-injection mode, a different value is set as the fuel amount to be maintained constant in the twice-injection mode. It is therefore allowed to cope with a change in the proper amount caused by a change in the operation conditions while enabling the fuel injection amount in the twice-injection mode to be easily conformed.

Here, the operation conditions may be the fuel injection amount in a cycle corresponding to a reference target equivalence ratio.

According to this constitution, the fuel injection amount to be maintained constant in the succeeding twice-injection mode is determined from the fuel injection amount corresponding to the reference target equivalence ratio (e.g., air excess rate $\lambda=1$) in the first time of shift to the twice-injection mode. The fuel injection amount corresponding to the reference target equivalence ratio varies depending upon an intake air amount of a cylinder, and the fuel amount to be maintained constant in the twice-injection mode can be properly set depending upon the intake air amount of the cylinder.

Also, the operation conditions may be used as the target equivalence ratio in the first time of shift to the twice-injection mode.

According to this constitution, the fuel injection amount to be maintained constant in the twice-injection mode is determined based upon the target equivalence ratio in the first time of shift to the twice-injection mode, and the fuel injection amount determined in the first time depending upon the target equivalence ratio is maintained in either the intake stroke or the compression stroke. Thus, the fuel amount to be maintained constant in the twice-injection mode is set to cope with a difference in the demand due to the target equivalence ratio.

Furthermore, the fuel injection amount in the compression stroke in the stratified mode may be operated, the constant amount may be variably set as a predetermined ratio of the fuel injection amount in the stratified mode in the first time of shift to the twice-injection mode, and an amount obtained by subtracting the above-mentioned constant amount from the fuel injection amount in the stratified mode, may be set as the fuel injection amount at the other injection timing.

According to this constitution, the fuel injection amount is operated in the twice-injection mode in the same manner as that in the stratified mode, the injection amount to be maintained constant in the twice-injection mode is determined from the injection amount for the stratified mode operated in the first time of shift to the twice-injection mode, and the injection amount at the other injection timing is set as the amount obtained by subtracting the constant amount from the injection amount for the stratified mode. It is therefore allowed to supply the fuel in an amount corresponding to the target torque in the stratified mode.

Moreover, the fuel injection amount in the intake stroke may be operated in the homogeneous mode, the constant amount may be variably set as a predetermined ratio of the fuel injection amount in the homogeneous mode in the first time of shift to the twice-injection mode, and an amount obtained by subtracting the above-mentioned constant amount from the fuel injection amount in the homogeneous mode may be set as the fuel injection amount at the other injection timing.

According to this constitution, the fuel injection amount is operated in the twice-injection mode in the same manner as in the homogeneous mode, the constant injection amount to be maintained in the twice-injection mode is determined from the injection amount for the homogeneous mode operated in the first time of shift to the twice-injection mode, and the injection amount at the other injection timing is set as the amount obtained by subtracting the constant amount from the injection amount for the homogeneous mode. It is therefore allowed to supply the fuel in an amount corresponding to the target torque in the homogeneous mode.

It is further preferred that the fuel injection amounts in the intake stroke and in the compression stroke in the twice-injection mode are limited to be not smaller than a minimum injection amount.

According to this constitution, when the fuel injection amounts in the intake stroke and in the compression stroke are smaller than the minimum injection amount, the amounts of fuel injection are changed to be at least not smaller than the injection minimum amount. This prevents the occurrence of such an event in that the fuel injection amounts in the intake stroke and in the compression stroke become smaller than the minimum injection amount, and the metering precision of the fuel injection valves is no longer maintained.

Other objects and features of the invention will become obvious from the following description of the embodiments in conjunction with the accompanying drawings.

DESCRIPTION OF THE PREFERRED EMBODIMENTS

Embodiments of the invention will now be described.

Figure 1:
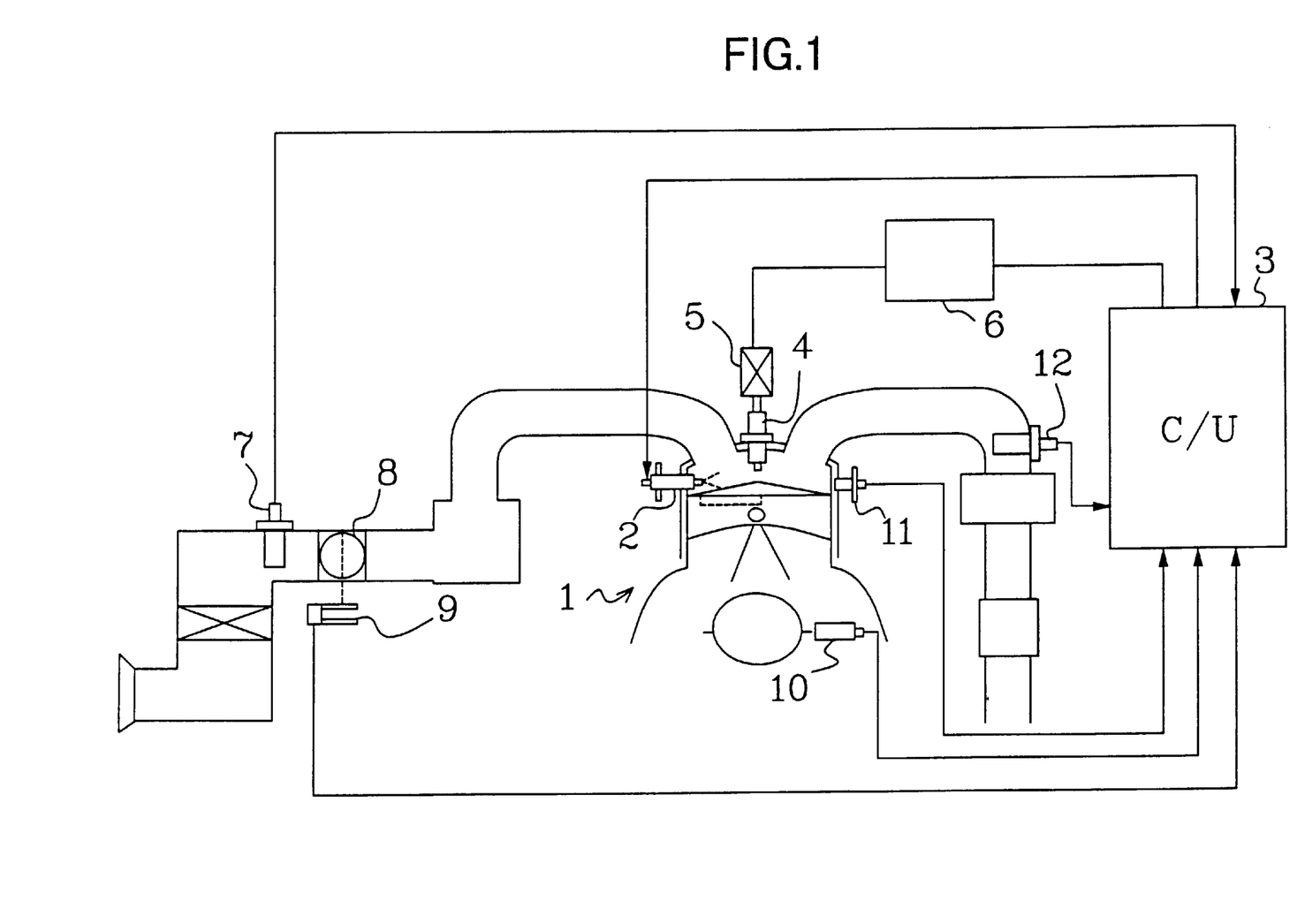
FIG. 1 is a diagram illustrating the system constitution of an engine according to an embodiment of the present invention.

FIG. 1 is a diagram illustrating the system constitution of an engine according to an embodiment. An engine 1 shown in FIG. 1 is a direct-injection gasoline engine equipped with a fuel injection valve 2 for directly injecting fuel into each of cylinders and with an ignition plug 4 for each of the cylinders.

The fuel injection valve 2 is controlled for each of the cylinders depending upon an injection pulse signal from a control unit 3 incorporating a microcomputer. Furthermore, each ignition plug 4 is equipped with an ignition coil 5. Depending upon an ignition signal from the control unit 3, a power transistor unit 6 turns the supply of current to a primary side of the ignition coil 5 on and off, so that an ignition timing is controlled for each of the cylinders.

The control unit 3 receives detection signals from various sensors in order to control a fuel injection amount, fuel injection timing and ignition timing.

The above-mentioned various sensors include an air flow meter 7 for detecting an intake air flow amount, a throttle sensor 9 for detecting the opening degree of a throttle valve 8, a crank angle sensor 10 for detecting the crank angle, a water temperature sensor 11 for detecting the temperature of the cooling water, an oxygen sensor 12 for detecting an average air-fuel ratio of combustion mixture based upon a concentration of oxygen in the exhaust gas, and the like.

The control unit 3 is provided with a plurality of target equivalence ratio maps in which have been set, in advance, target equivalence ratios and combustion modes depending, for example, upon target output torque and a rotational speed of the engine, makes a reference to the plurality of target equivalence ratio maps and changes over the maps depending upon the conditions such as the water temperature, a period of time after the engine start, vehicle speed and acceleration, and discriminates the target equivalence ratio and a demand for the combustion mode (mode change-over device).

As the combustion mode, there can be set a homogeneous mode for accomplishing a homogeneous combustion by injecting the fuel in the intake stroke only, a stratified mode for accomplishing a stratified combustion by forming a rich air-fuel mixture near the ignition plug 4 by injecting the fuel in the compression stroke only, or a twice-injection mode for injecting the fuel in the intake stroke and in the compression stroke in a cycle at the time of change-over between the homogeneous mode and the stratified mode.

The control unit 3 makes a reference to the target equivalence ratio map, determines the target equivalence ratio and the combustion mode, operates a basic fuel injection amount TP corresponding to a reference target equivalence ratio (e.g., $\lambda=1$) based on the intake air flow amount and the rotational speed of the engine, corrects the basic fuel injection amount TP depending upon a target equivalence ratio at that moment to finally operate an fuel injection amount TI, and also determines an injection timing based on the combustion mode and the operation conditions, and outputs, to the fuel injection valve 2, an injection pulse signal having a pulse width corresponding to the fuel injection amount TI at the injection timing. In the twice-injection mode, the above-mentioned fuel injection amount TI to be injected divided into two in the intake stroke and in the compression stroke.

The control unit 3 makes a reference to an ignition timing map that has been set in advance to determine the ignition timing, determines the current-flowing time (current-flowing angle) depending upon a battery voltage and the like, and outputs an ignition signal to the power transistor unit 6 based upon the ignition timing and the current-flowing time (current-flowing angle), to thereby control the ignition timing of each of the ignition plugs 4.

Figure 2:
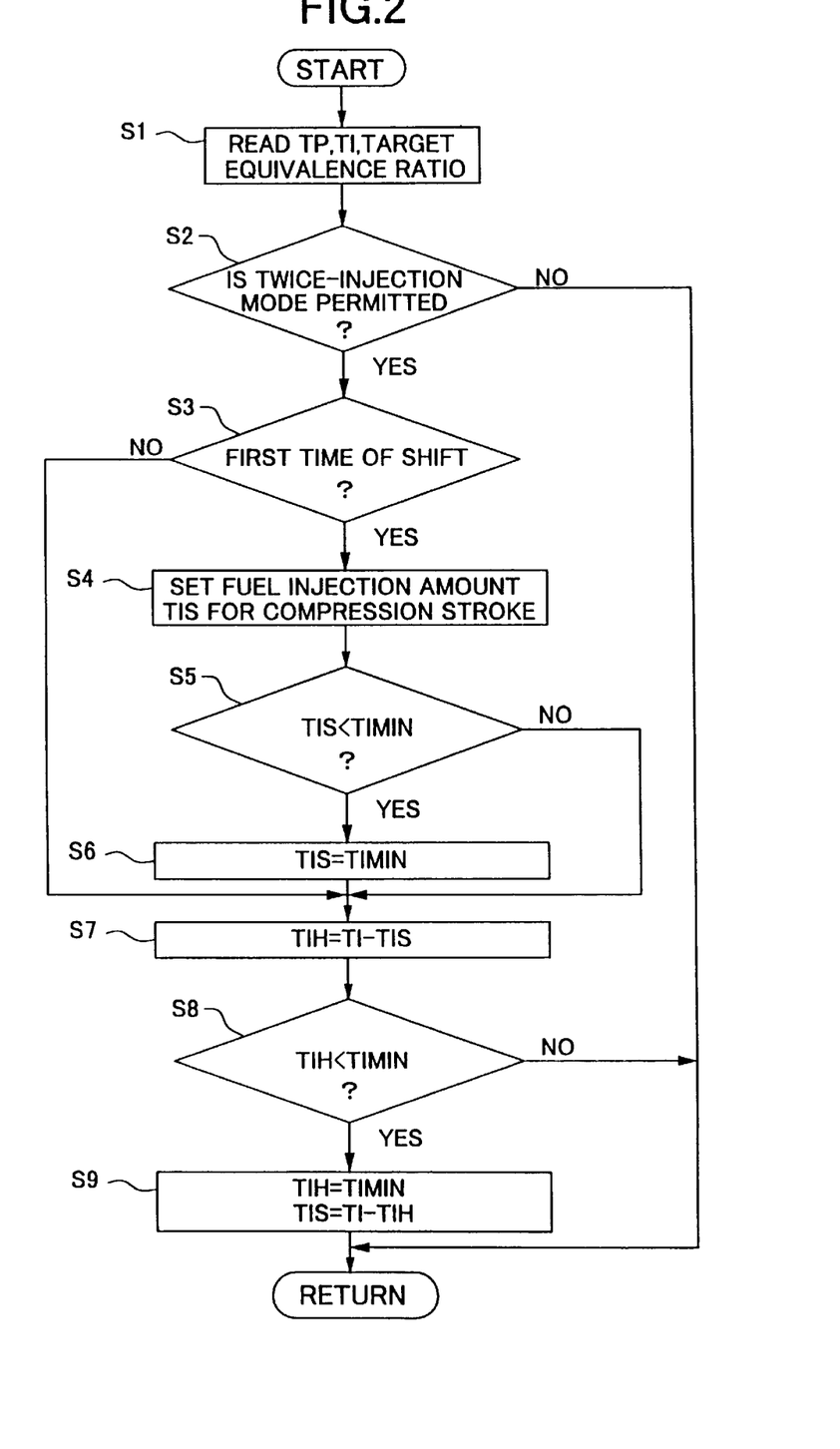
FIG. 2 is a flow chart illustrating a routine for setting the injection amounts in the twice-injection mode.

Here, the fuel injection amounts in the intake stroke and in the compression stroke in the twice-injection mode are set in a manner as shown in a flow chart of FIG. 2. In this embodiment, the function of the injection amount control device is provided in software by the control unit 3 as shown in the flow chart of FIG. 2.

In the flow chart of FIG. 2, first, the basic fuel injection amount TP, fuel injection amount TI and target equivalence ratio are read at step S1.

At next step S2, it is determined whether the execution of the twice-injection mode is permitted or not. When the twice-injection mode has been permitted, the program proceeds to step S3 where it is determined whether or not it is the first time of shift to the twice-injection mode.

When it is the first time of shift, the program proceeds to step S4 where a fuel injection amount TIS is set for the compression stroke.

The fuel injection amount TIS for the compression stroke set at step S4 can be given as a fixed value that has been stored in advance.

Figure 3:
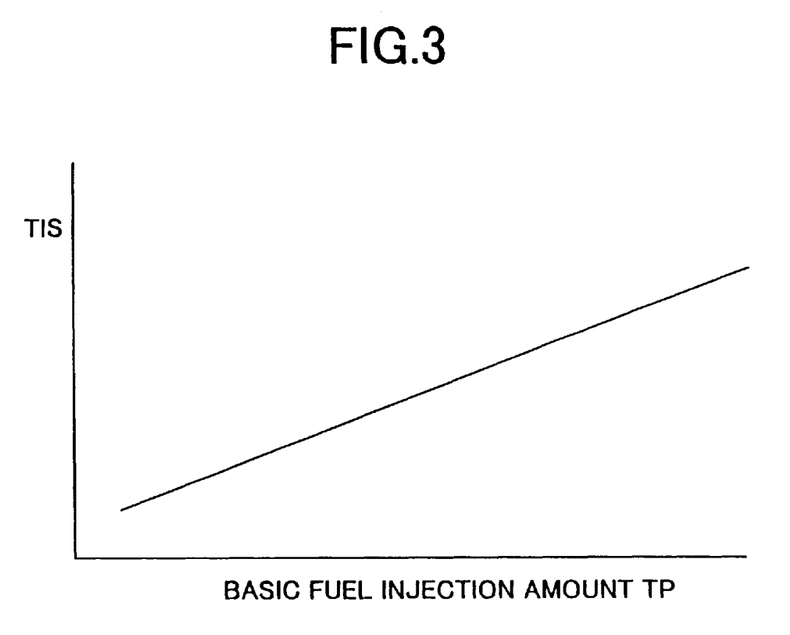
FIG. 3 is a diagram illustrating the characteristics of the injection amount TIS for the compression stroke depending upon a basic fuel injection amount.

As shown in FIG. 3, furthermore, the fuel injection amount TIS may be set to a large value with an increase in the basic fuel injection amount TP relying upon the basic fuel injection amount TP in the first time of shift to the twice-injection mode.

The fuel injection amount TIH for the homogeneous mode may be operated in the twice-injection mode, the fuel injection amount TIS for the compression stroke may be set in the twice-injection mode as a predetermined ratio of the fuel injection amount TIH in the first time of shift and, then, the amount obtained by subtracting the fuel injection amount TIS in the first time of shift from the fuel injection amount TIH successively operated, may be injected in the intake stroke, so that a combustion in the twice-injection mode is based upon a homogeneous combustion.

Figure 6:
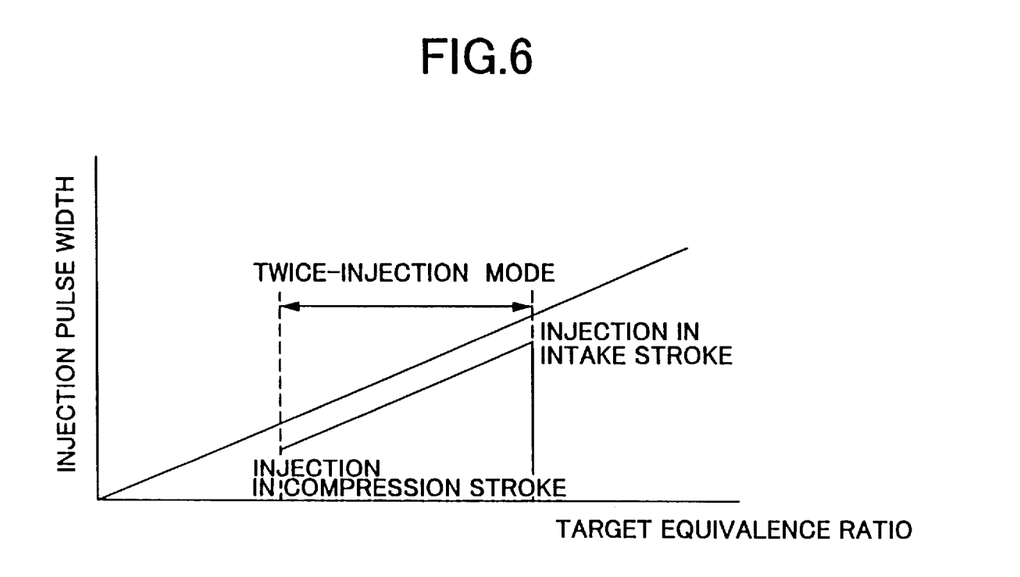
FIG. 6 is a diagram illustrating an embodiment for controlling the fuel injection amount to be constant in the intake stroke in the twice-injection mode.

Similarly, when the injection amount in the intake stroke is maintained constant in the twice-injection mode as shown in FIG. 6, the fuel injection amount TIS for the stratified mode may be operated in the twice-injection mode, the fuel injection amount TIH for the intake stroke in the twice-injection mode may be set as a predetermined ratio of the fuel injection amount TIS in the first time of shift and, then, the amount obtained by subtracting the fuel injection amount TIH set in the first time in the shift from the fuel injection amount TIS successively operated, may be injected in the compression stroke, so that a combustion in the twice-injection mode is based upon a stratified combustion.

Figure 4:
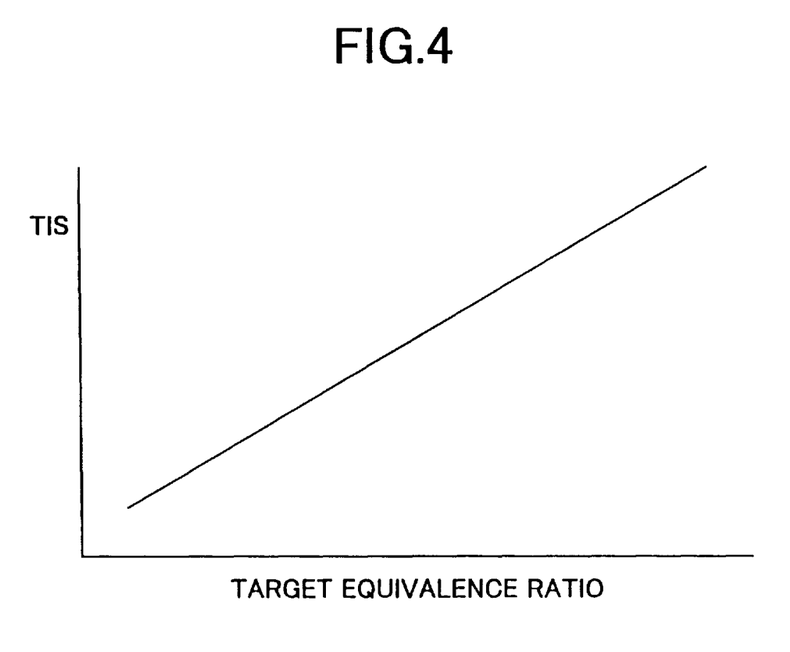
FIG. 4 is a diagram illustrating the characteristics of the injection amount TIS for the compression stroke depending upon a target equivalence ratio.

As shown in FIG. 4, furthermore, the fuel injection amount TIS may be set to a large value with an increase in the target equivalence ratio (with an increase in the target air-fuel ratio) based upon the target equivalence ratio in the first time of shift to the twice-injection mode.

When the fuel injection amount TIS for the compression stroke is set at the step S4, a minimum injection amount (minimum width of injection pulse) TIMIN for maintaining linearity in the correlation between the width of the injection pulse and the practical injection amount, is compared at step S5 with the fuel injection amount TIS set at step S4.

When the fuel injection amount TIS is smaller than the minimum injection amount TIMIN, the program proceeds to step S6 where the minimum injection amount TIMIN is set to the fuel injection amount TIS, and minimum injection amount TIS is prevented from being set to be smaller than the minimum injection amount TIMIN.

When the fuel injection amount TIS set at the step S4 is not smaller than the minimum injection amount TIMIN, the program proceeds to step S7 jumping over step S6.

Even when it is determined at step S3 that it is not the first time, the program proceeds to step S7 jumping over steps S4 to S6. That is, the fuel injection amount TIS for the compression stroke at steps S4 to S6 is set only in the first time of shift to the twice-injection mode.

At step S7, the fuel injection amount TIS for the compression stroke is subtracted from the fuel injection amount TI which is the required fuel injection amount in one cycle, and the result is used as the fuel injection amount TIH (TIP=TI−TIS) for the intake stroke.

At step S8, the fuel injection amount TIH for the intake stroke is compared with the minimum injection amount TIMIN.

When the fuel injection amount TIH is smaller than the minimum injection amount TIMIN, the program proceeds to step S9 where the minimum injection amount TIMIN is set to the fuel injection amount TIH. Therefore, the fuel injection amount TIH is prevented from being set to be smaller than the minimum injection amount TIMIN. Besides, since the fuel injection amount TIH is corrected to become greater than (TI−TIS), the fuel injection amount TIS for the compression stroke is updated to be TIS=TI−TIH.

Figure 5:
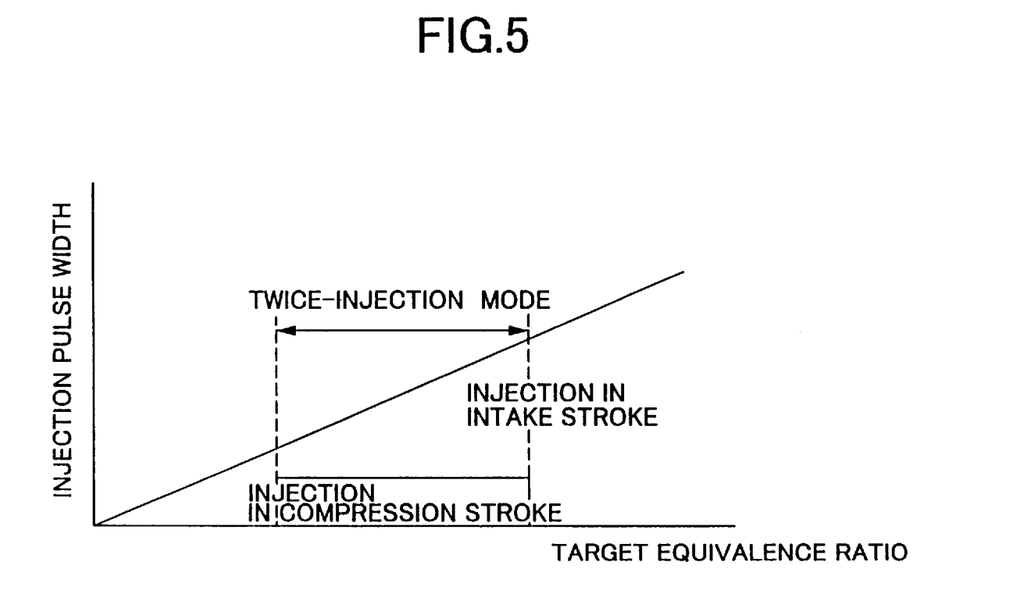
FIG. 5 is a diagram illustrating an embodiment for controlling the fuel injection amount to be constant in the compression stroke in the twice-injection mode.

According to the above-mentioned constitution, the fuel injection amount TIS for the compression stroke basically maintains the value set in the first time of when shifted into the twice-injection mode during the twice-injection mode except when the fuel injection amount TIS is updated at step S9. Therefore, a change in the fuel injection amount TI in one cycle is coped with by an increase or a decrease in the fuel amount TIH injected in the intake stroke (see FIG. 5).

Therefore, the fuel injection amount can be easily conformed enabling the stratified mode and the homogeneous mode to be smoothly changed over from one to the other yet maintaining stability in the combustion compared with a case that the fuel injection amounts are changed in both the compression stroke and the intake stroke in the twice-injection mode.

In the foregoing embodiment, the fuel injection amount was set to be constant in the compression stroke and the fuel injection amount was varied in the intake stroke in the twice-injection mode. Conversely, however, it is also possible to set the fuel injection amount constant in the intake stroke and vary the fuel injection amount in the compression stroke thereby to control the fuel injection amount (see FIG. 6).

What is claimed is:

1. An apparatus for controlling fuel injection for a direct-injection gasoline engine equipped with fuel injection valves for directly injecting fuel into cylinders, comprising:

a mode change-over device that changes over among a stratified mode for injecting the fuel in a compression stroke only, a homogeneous mode for injecting the fuel in an intake stroke only, and a twice-injection mode for injecting the fuel both in the intake stroke and in the compression stroke in a cycle depending upon operation conditions; and an injection amount control device that controls a fuel amount injected in one cycle by setting a fuel injection amount to be constant in the intake stroke and to be variable in the compression stroke.

2. The apparatus for controlling fuel injection for a direct-injection gasoline engine according to claim 1, wherein said injection amount control device uses said constant amount as a fixed value that has been stored in advance.

3. The apparatus for controlling fuel injection for a direct-injection gasoline engine according to claim 1, wherein said injection amount control device variably sets said constant amount depending upon the operation conditions in the first time of shift to the twice-injection mode.

4. The apparatus for controlling fuel injection for a direct-injection gasoline engine according to claim 3, wherein the operation conditions in said injection amount control device determines the fuel injection amount in a cycle that corresponds to a reference target equivalence ratio.

5. The apparatus for controlling fuel injection for a direct-injection gasoline engine according to claim 3, wherein the operation conditions in said injection amount control device determines a target equivalence ratio in the first time of shift to the twice-injection mode.

6. The apparatus for controlling fuel injection for a direct-injection gasoline engine according to claim 1, wherein said injection amount control device operates the fuel injection amount in the compression stroke in said stratified mode, variably sets said constant amount as a predetermined ratio of the fuel injection amount in the stratified mode in the first time of shift to the twice-injection mode, and sets an amount obtained by subtracting said constant amount from the fuel injection amount in the stratified mode, as the fuel injection amount in the compression stroke.

7. An apparatus for controlling fuel injection for a direct-injection gasoline engine according to claim 1, wherein said injection amount control device limits the fuel injection amounts in both the intake stroke and in the compression stroke in the twice-injection mode to be not smaller than a minimum injection amount.

8. A method of controlling fuel injection for a direct-injection gasoline engine equipped with fuel injection valves for directly injecting fuel into cylinders, comprising:
controlling the fuel injection valves to change over among a stratified mode that injects the fuel in a compression stroke only, a homogeneous mode that injects the fuel in an intake stroke only, and a twice-injection mode for injecting the fuel in the intake stroke and in the compression stroke in a cycle, and,
in said twice-injection mode, setting a fuel injection amount to be constant in the intake stroke and to be variable in the compression stroke to thereby control a fuel amount injected in one cycle.

9. A method of controlling fuel injection for a direct-injection gasoline engine according to claim 8, wherein said constant amount is used as a fixed value that has been stored in advance.

10. A method of controlling fuel injection for a direct-injection gasoline engine according to claim 8, wherein said constant amount is variably set depending upon operation conditions in the first timed of shift to the twice-injection mode.

11. A method of controlling fuel injection for a direct-injection gasoline engine according to claim 10, wherein the operation conditions determine the fuel injection amount in a cycle that corresponds to a reference target equivalence ratio.

12. A method of controlling fuel injection for a direct-injection gasoline engine according to claim 10, wherein the operation conditions determine a target equivalence ratio in the first time of shift to the twice-injection mode.

13. A method of controlling fuel injection for a direct-injection gasoline engine according to claim 9, wherein the fuel injection amount in the compression stroke when said stratified mode is operated, said constant amount is variably set as a predetermined ratio of the fuel injection amount in the stratified mode in the first time of shift to the twice-injection mode, and an amount obtained by subtracting said constant amount from the fuel injection amount in the stratified mode is set as the fuel injection amount in the compression stroke.

14. A method of controlling fuel injection for a direct-injection gasoline engine according to claim 8, wherein the fuel injection amounts in the intake stroke and in the compression stroke in the twice-injection mode are limited to be not smaller than a minimum injection amount, respectively.

15. An apparatus for controlling fuel injection for a direct-injection gasoline engine equipped with fuel injection valves for directly injecting fuel into cylinders., comprising:
a mode change-over device that changes over among a stratified mode for injecting fuel in a compression stroke only, a homogeneous mode for injecting the fuel in an intake stroke only, and a twice-injection mode for injecting the fuel both in the intake stroke and in the compression stroke in a cycle depending upon operation conditions; and
and injection amount control device that controls a fuel amount injected in one cycle by setting a fuel injection amount to be constant in one of the intake stroke and the compression stroke and to be variable in the other stroke in the twice-injection mode, and variably sets said constant amount depending upon the operation conditions in the first time of shift to the twice-injection mode.

16. An apparatus for controlling fuel injection for a direct-injection gasoline engine according to claim 15, wherein the operation conditions in said injection amount control device determine the fuel injection amount in a cycle that corresponds to a reference target equivalence ratio.

17. An apparatus for controlling fuel injection for a direct-injection gasoline engine according to claim 15, wherein the operation conditions in said injection amount control device determine a target equivalence ratio in the first time of shift to the twice-injection mode.

18. An apparatus for controlling fuel injection for a direct-injection gasoline engine according to claim 15, wherein said injection amount control device operates the fuel injection amount in the compression stroke in said stratified mode, variably sets said constant amount as a predetermined ratio of the fuel injection amount in the stratified mode in the first time of shift to the twice-injection mode, and sets an amount obtained by subtracting said constant amount from the fuel injection amount in the stratified mode, as the fuel injection amount at the other injection timing.

19. An apparatus for controlling fuel injection for a direct-injection gasoline engine according to claim 15, wherein said injection amount control device operates the fuel injection amount in the intake stroke in said homogeneous mode, variably sets said constant amount as predetermined ratio of the fuel injection amount in the homogeneous mode in the first time of shift to the twice-injection mode, and sets an amount obtained by subtracting said constant amount from the fuel injection amount in the homogeneous mode, as the fuel injection amount at the other injection timing.

20. A method of controlling fuel injection for a direct-injection gasoline engine equipped with fuel injection valves for directly injecting fuel into cylinders, comprising:
changing over among a stratified mode for injecting the fuel in a compression stroke only, a homogeneous mode for injecting the fuel in an intake stroke only, and a twice-injection mode for injecting the fuel in the intake stroke, and in the compression stroke in a cycle, and, in said twice-injection mode, setting a fuel injection amount to be constant in one of the intake stroke and in the compression stroke and to be variable in the other stroke to thereby control a fuel amount injected in one cycle, and setting variably said constant amount depending upon operation conditions in the first time of shift to the twice-injection mode.

21. A method of controlling fuel injection for a direct-injection gasoline engine according to claim 20, wherein the operation conditions determine the fuel injection amount in a cycle that corresponds to a reference target equivalence ratio.

22. A method of controlling fuel injection for a direct-injection gasoline engine according to claim 20, wherein the operation conditions determine a target equivalence ratio in the first a time of shift to the twice-injection mode.

* * * * *

UNITED STATES PATENT AND TRADEMARK OFFICE
CERTIFICATE OF CORRECTION

PATENT NO. : 6,073,606
DATED : June 13, 2000
INVENTOR(S) : Hirokazu Shimizu, et al.

It is certified that error appears in the above-indentified patent and that said Letters Patent is hereby corrected as shown below:

On the title page:

Add in line [73] after Japan: Nissan Motor Co., Ltd., Yokohama, Japan

Signed and Sealed this

Twenty-seventh Day of March, 2001

Attest:

NICHOLAS P. GODICI

Attesting Officer

Acting Director of the United States Patent and Trademark Office